US010783165B2

(12) United States Patent
Furuichi et al.

(10) Patent No.: US 10,783,165 B2
(45) Date of Patent: *Sep. 22, 2020

(54) SYNCHRONIZING MULTIPLE DEVICES

(71) Applicant: International Business Machines Corporation, Armonk, NY (US)

(72) Inventors: Sanehiro Furuichi, Tokyo (JP); Masami Tada, Kanagawa-ken (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 478 days.

This patent is subject to a terminal disclaimer.

(21) Appl. No.: 15/597,509

(22) Filed: May 17, 2017

(65) Prior Publication Data

US 2018/0336259 A1    Nov. 22, 2018

(51) Int. Cl.
  *G06F 16/27*    (2019.01)
  *H04L 29/08*    (2006.01)

(52) U.S. Cl.
  CPC ............ *G06F 16/275* (2019.01); *G06F 16/27* (2019.01); *H04L 67/1095* (2013.01); *H04L 67/34* (2013.01); *H04L 67/10* (2013.01); *H04L 67/12* (2013.01); *H04L 67/2823* (2013.01)

(58) Field of Classification Search
  CPC ... G06F 16/275; G06F 16/27; H04L 67/1095; H04L 67/34; H04L 67/10; H04L 67/12; H04L 67/2823
  See application file for complete search history.

(56) References Cited

U.S. PATENT DOCUMENTS

| | | | | |
|---|---|---|---|---|
| 5,261,089 A | * | 11/1993 | Coleman | G06F 9/466 |
| 5,307,483 A | | 4/1994 | Knipfer et al. | |
| 5,410,684 A | * | 4/1995 | Ainsworth | G06F 9/466 |
| | | | | 714/18 |
| 6,539,381 B1 | * | 3/2003 | Prasad | G06F 16/27 |
| 2004/0064817 A1 | * | 4/2004 | Shibayama | G06F 9/5066 |
| | | | | 718/104 |
| 2006/0171523 A1 | * | 8/2006 | Greenwell | H04W 4/00 |
| | | | | 379/242 |
| 2008/0294769 A1 | * | 11/2008 | Doi | G06F 9/52 |
| | | | | 709/224 |
| 2009/0006621 A1 | * | 1/2009 | Ellis | G06F 9/52 |
| | | | | 709/225 |

(Continued)

OTHER PUBLICATIONS

Chris Coyier, Multiple Simultaneous Ajax Requests in jQuery, Feb. 13, 2014, all pages. (Year: 2014).*

(Continued)

*Primary Examiner* — Jay A Morrison
*Assistant Examiner* — Antonio J Caiado
(74) *Attorney, Agent, or Firm* — Yee & Associates, P.C.

(57) ABSTRACT

An apparatus, and computer program product for synchronously starting programs on multiple devices connected to a server is provided. A synchronous point of a program to be synchronously started for each of the multiple devices is identified. A wait function is dynamically injected into the synchronous point for each of the multiple devices. A start time from the server is received in response to the multiple devices entering a waiting state. The programs are synchronously started in response to the start time arriving for each of the multiple devices.

10 Claims, 10 Drawing Sheets

(56) References Cited

U.S. PATENT DOCUMENTS

| | | | | |
|---|---|---|---|---|
| 2009/0292765 A1* | 11/2009 | Leedberg | | G06F 9/541 |
| | | | | 709/203 |
| 2010/0169618 A1* | 7/2010 | Ramalingam | | G06F 8/456 |
| | | | | 712/220 |
| 2010/0225811 A1* | 9/2010 | Konvisser | | G11B 27/28 |
| | | | | 348/512 |
| 2013/0311140 A1* | 11/2013 | Schechter | | H04L 67/34 |
| | | | | 702/188 |
| 2014/0059182 A1* | 2/2014 | Miura | | H04H 20/18 |
| | | | | 709/219 |
| 2014/0071344 A1 | 3/2014 | Francisco | | |
| 2014/0164735 A1 | 6/2014 | Dobbs et al. | | |
| 2014/0226949 A1* | 8/2014 | Onishi | | H04N 21/6125 |
| | | | | 386/201 |
| 2015/0032801 A1* | 1/2015 | Hart | | H04W 4/12 |
| | | | | 709/203 |
| 2015/0249647 A1* | 9/2015 | Mityagin | | H04L 63/10 |
| | | | | 713/168 |
| 2017/0104821 A1* | 4/2017 | Scurrell | | H04L 67/1095 |
| 2017/0180069 A1* | 6/2017 | Leng | | H04B 7/2643 |
| 2018/0336260 A1 | 11/2018 | Furuichi et al. | | |
| 2019/0037018 A1* | 1/2019 | Scurrell | | H04W 4/80 |

OTHER PUBLICATIONS

Nvidia CUDA, Nvidia CUDA C Programming Guide, Apr. 16, 2012, Nvidia, Version 4.2, pp. 32-33 Explicit Synchronization (Year: 2012).*

List of IBM Patents or Patent Applications Treated as Related, dated Apr. 7, 2020, 2 pages.

* cited by examiner

SYNCHRONIZING MULTIPLE DEVICES

BACKGROUND

1. Field

The disclosure relates generally to systems for synchronously starting programs on devices connected to a server. Specifically, the systems dynamically inject a wait function into the program on each of the devices to control a start time for the devices.

2. Description of the Related Art

The Internet of things (IoT) refers to the interconnectivity of physical things, such as devices, automobiles, trains, airplanes, and buildings. The IoT may provide direct integration of the physical things into computer-based systems. The IoT may permit grids, houses, transportation, and cities to collect and exchange data. Each of the physical things may be connected electronically by processors, software, and sensors to enable the collection and exchange of data.

In the IoT, each physical thing may be uniquely identifiable through its embedded computing system and may interoperate within an existing Internet infrastructure. In the area of transportation, vehicles may be connected to collect and exchange data regarding speed, direction, fuel efficiency, travel distance, and a record of travel destinations. Vehicle may include driverless cars. Testing of driverless cars may require the collection and exchange of data from devices located on each driverless car. Each device may have its own internal time.

Execution of time-critical test scenarios for driverless cars may depend on other devices. Execution of time-critical test scenarios may be difficult or impossible if the devices are not synchronized. Multiple devices need to be synchronously operated, not only for testing, but also for actual real-life operation. For example, devices may be temporarily stopped in order to change configuration information, and then simultaneously operated after the configuration change. Therefore, a need exists to start multiple driverless cars simultaneously.

SUMMARY

According to one illustrative embodiment, a computer-implemented method for synchronously starting programs on multiple devices connected to a server is provided. A synchronous point of a program to be synchronously started for each of the multiple devices is identified. A wait function is dynamically injected into the synchronous point for each of the multiple devices. A start time, from the server, is received in response to the multiple devices entering a waiting state. The programs are synchronously started in response to the start time arriving for each of the multiple devices.

DETAILED DESCRIPTION

Figure 1:
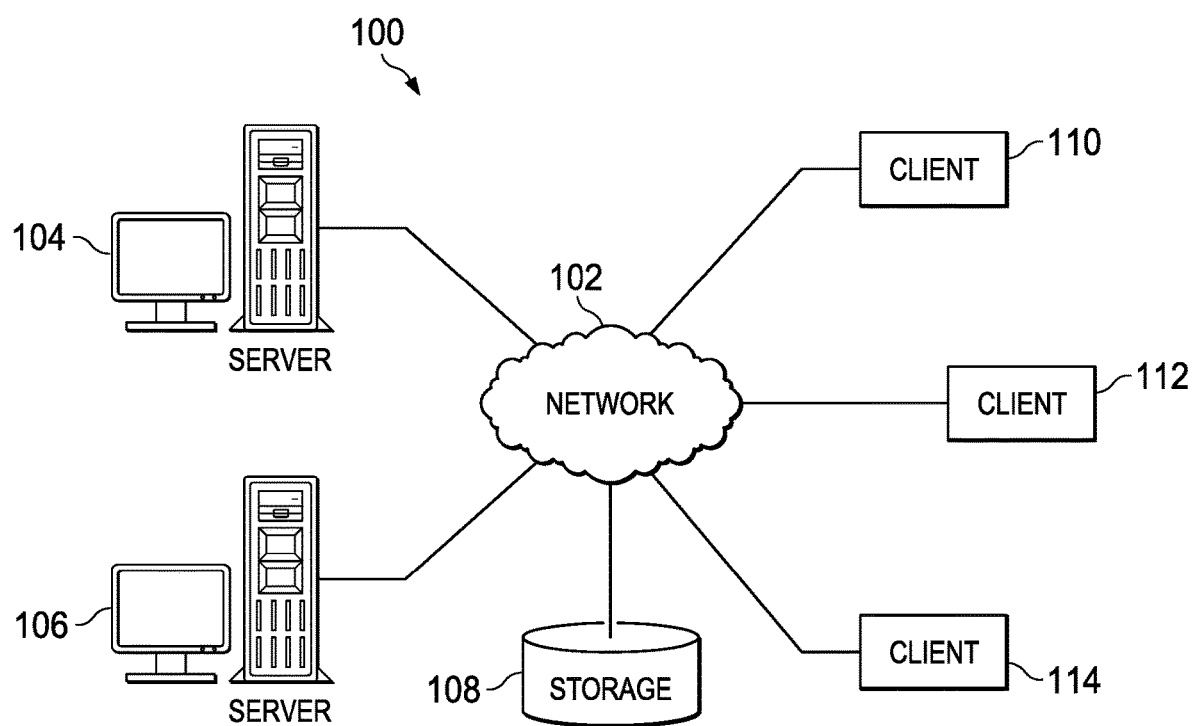
FIG. 1 is a pictorial representation of a network of data processing systems in which an illustrative embodiment may be implemented.

In an illustrative embodiment, synchronization may be performed with multiple devices in multiple gateways. As used herein, an edge gateway is a virtual router for networks that may be virtual device context networks. Preparation periods from the activation of the devices to the actual transmission of the data may be aligned to allow the data to be synchronously transmitted. Synchronous points of programs on multiple devices may be identified by a server. A wait function may be injected dynamically into the synchronous point for each of the multiple devices. As used herein, "wait function" means a function that provides inter-thread synchronization or process-process synchronization on an operating system, on different operating systems and for multiple devices on an Edge gateway. In an illustrative embodiment, a wait function may assign a start time. Changes in configuration information may be distributed from the server. Changes in configuration information may be changes in a type of data to be acquired, in the time intervals for acquisition of data, and in designations of data format. In order to make the changes in configuration information, devices may be temporarily suspended by the injected wait function. Each device is informed of the information. The devices are initialized. As used herein, initialization is the assignment of an initial value for a data object or variable. A time server and device management function may detect that the initialization of all the devices is finished and send a start time to release the wait function and execute the changes in the multiple devices in the multiple gateways. At the start time, changes to the device are performed. The time server and device management function insures that changes are performed synchronously.

In automotive applications of IoT, data devices may be created to acquire and read test data in vehicles. Data devices in the vehicles may need to be operated simultaneously in multiple edge gateways. Situations may arise where multiple data from separate devices must be recorded at the same moment. Location data, such as longitude and latitude from a car-navigation device or speed data from a vehicle body device, may need to be recorded at the same moment to prevent inconsistencies. Inconsistencies may arise from time lags due to manual activation or the state of the devices. If a time lag occurs, data acquired from vehicles running at a certain interval may not reflect the same intervals. Indeed, in the case of a driverless car, if the data is used to control the driverless car, a collision may occur due to the differences in data.

Even if a device is designed to operate a particular action at a predetermined interval, such as a recording and sending sensor data, it may be difficult or impossible to completely synchronize the device with other devices. An example may be data unit conversion. Configuration of vehicle devices may require conforming data from one device in kilometers per hour with data from other devices in miles per hour. Data units may need to be converted at the same time in all devices.

Synchronization with a time server may be used to insert the wait function. The edge gateway may synchronize with the time server when activated. When there is a wait function for each device, synchronization may be performed at a designated time referred to as a "start time". In an illustrative embodiment, designated time is designated by relative time elapsed in seconds after an occurrence of a trigger. The time server converts the relative time into absolute time and sends the absolute time to each device. When there is a manager in the device, the manager may serve as a relay for the time server and the wait function.

A start time may be designated by relative time elapsed, in seconds, after an occurrence of a certain state. A time server and device management function may convert the relative time into absolute time and send the absolute time to each device. The wait function may be released at the start time. The start time may be different for each device.

Triggers may be employed for sending the start time. A trigger may be when a particular device enters a waiting state. A trigger may be when wait functions in all devices cause the devices to enter waiting states. A trigger may be when a plugin manager of the edge gateway or a time server is informed that all devices have entered waiting states. A trigger may be when a property file of a time server indicates that multiple devices have entered a waiting state.

The programs may be synchronously started in response to the start time arriving for each of the multiple devices. The start time received by one of the multiple devices may be different from the start time received by another one of the multiple devices. The server may be provided with a function of a time server and each of the multiple devices may be synchronized with the time server. Time may be corrected in the device. A system for synchronously starting programs on multiple devices connected to a server, may comprise a bus system, a storage device connected to the bus system, and a processor connected to the bus system, wherein the storage device stores program instructions and the processor executes the program instructions to identify a synchronous point of a program to be synchronously started for each of the multiple devices and to dynamically inject a wait function into the synchronous point for each of the multiple devices. As used herein a "synchronous point" is a point selected dynamically by a computer system to embed a wait function into the source code of a program in accordance with one or more criteria. In an illustrative embodiment, a synchronous point to embed a wait function into the source code of a program may be selected manually by a programmer at a display. In an illustrative embodiment, the point at which the wait function is embedded may be the end of an initialization part of a start method. In another illustrative embodiment, wait functions may be embedded into the source code when the source code is written. In another illustrative embodiment a programmer may use a graphical user interface to select a point to insert a wait function, and then to dynamically inject the wait function into the program at a selected point. In an illustrative embodiment, the selected point may be the point at which initialization is finished. Dynamic insertion may be accomplished by the computer system automatically determining a time at which initialization is finished, and dynamically injecting the wait function into the part of the program at which initialization is finished so that the synchronous point is established by the computer system. Other criteria may be used in other embodiments. In an illustrative embodiment, when a thread class is defined such as Java and the thread class is extended to implement the class, a start method generally includes an initialization part. The wait function may be dynamically injected at the end of the initialization part of the start method. The storage device may store further program instructions and the processor execute the further program instructions to receive a start time from the server in response to the multiple devices entering a waiting state and synchronously start the programs in response to the start time arriving for each of the multiple devices. Time may be corrected in the device. The start time may not be relative time. The start time may be absolute time. The start time may be received from the server, and the wait function may be released when the start time arrives.

The present invention may be a system, a method, and/or a computer program product. The computer program product may include a computer readable storage medium or media, having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, a segment, or a portion of instructions, which comprises one or more executable instructions for implementing the specified logical functionor functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

With reference now to the figures, and in particular, with reference to FIGS. 1-7, diagrams of data processing environments are provided in which illustrative embodiments may be implemented. It should be appreciated that FIGS. 1-7 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 or server 106 may, for example, manage recovery of a customer workload after failure of a primary computing environment executing the customer workload. The failed primary computing environment may be, for example, a server or a set of servers in a data center environment or a cloud environment. Server 104 or server 106 also may generate a secondary virtual machine seed image storage at a secondary data processing site for the failure recovery. The configuration of the secondary data processing site is similar to the configuration of the primary data processing site.

Client 110, client 112, and client 114 also connect to network 102. Clients 110, 112, and 114 are clients of server 104 and/or server 106. Server 104 and server 106 may provide information, such as boot files, operating system images, virtual machine images, and software applications to clients 110, 112, and 114.

In this example, clients 110, 112, and 114 may each represent a different computing environment. A computing environment includes physical and software resources used to execute a set of one or more customer workloads or tasks. A computing environment may comprise, for example, one server, a rack of servers, a cluster of servers, such as a data center, a cloud of computers, such as a private cloud, a public cloud, or a hybrid cloud, or any combination thereof. In addition, each of clients 110, 112, and 114 may be a primary data processing site or a secondary data processing site. A primary data processing site initially executes a customer workload using a set of primary virtual machines and images. A secondary data processing site executes the customer workload using a set of secondary virtual machines and seed images when one or more primary virtual machines fail while processing the customer workload at the primary data processing site.

Storage 108 is a network storage device capable of storing any type of data in a structured format or an unstructured format. The type of data stored in storage 108 may be, for example, a list of computing environments with corresponding available resources, a list of primary data processing sites, a list of secondary data processing sites, a list of customer workloads, a plurality of virtual machine images, and the like. Further, storage unit 108 may store other types of data, such as authentication or credential data that may include user names, passwords, and biometric data associated with system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
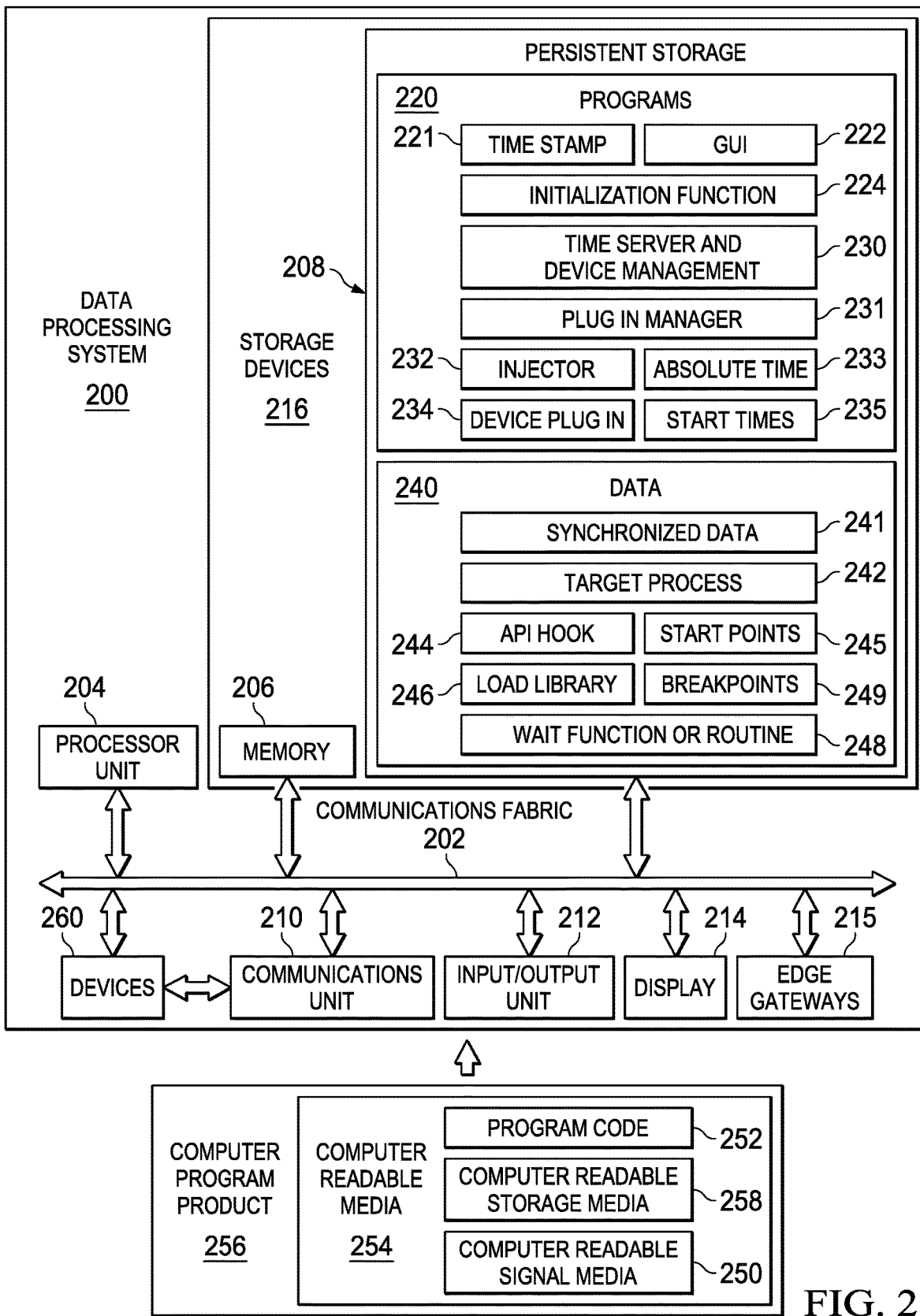
FIG. 2 is a diagram of a data processing system in which an illustrative embodiment may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output unit 212, display 214 and Edge gateways 215.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more storage devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 may store programs 220 and data 240. Programs 220 may include time server and device management 230 and injector 232. Injector 232 may be configured for dynamic injection of a wait routine into any function so that the wait routine may be embedded in the function. Injector 232 may comprise any technology that may embed a wait routine in any function. For example, a wait routine may be embedded at the beginning of a start function to start the process. Thus, when the process having the start function and the embedded wait routine runs, the process may wait before executing an original start because the wait routine causes the process to wait until an appointed time. Further, when all processes have a start function and a wait routine embedded, all processes can be run synchronously at an appointed time. The name of the start function may be arbitrary. For example, a name of a start function of process A may be "begin" and a name of a start function of a process B may be "run". Injector 232 may use API Hook 244 in data 240 to hook "begin" function for process A and to hook "run" function for process B. As used herein, "hooking" means one or more techniques to change the behavior of an operating system, an application, or a software component by intercepting one or more function calls, messages, or events. As used herein, "hook" means code that performs the interception of the function calls, events, or messages. API Hook 244 may be located in load library 246. Load library 246 may be a dynamic load library (DLL). Persistent storage 208 may also store the following programs or functions: time stamp 221, graphical user interface (GUI) 222, initialization function 224, plug-in manager 231, absolute time 233, device plug-in 234, and start times 235.

Data may include target process 242, API hook 244, synchronized data 241, start points 245, load library 246, wait function or routine 248, and breakpoints 249. Devices 260 may be connected to time server and device management 230 by a wired connection or a wireless connection via communications fabric 202 and communications unit 210. Devices 260 may be devices depicted in the illustrative embodiments of FIG. 3, FIG. 4 and FIG. 5. Devices 260 may be activated and synchronized with time server and device management 230 to create absolute time 233 and start times 235 in the devices. Synchronization with time server and device management 230 may require a time stamp used for sending data to time server and device management 230 for equalization. Time stamp 221 may provide a time stamp for synchronization with time server and device management 230. Start times from start times 235 may be acquired by devices 260 from time server and device management 230.

Absolute time 233 may be set as a start time to the devices by start times 235. In an alternate embodiment, start time may be absolute time 233 plus an amount of time determined to be after the multiple devices finish inquiring about time may be set as a start time. Acquisition of a start time may be used to insert the wait function. When an edge gateway, such as edge gateways 215 synchronizes with time server and management function 230, a start time from start times 235 may be sent to edge gateways 215. When multiple devices finish initialization, a start time may be sent to edge gateways 215, according to a setting on time server and management 215. When multiple devices enter a waiting state with a wait function, a start time may be sent to edge gateways 215 according to a setting on time server and management 230. When a particular device finishes initialization, a start time may be sent to edge gateways 215 according to a setting on time server and device management 230. Edge gateways 215 may receive a start time by polling. The start time may indicate absolute time released by the wait function of the device and be represented by year, month, day, hour, minute, and second, instead of time elapsed.

Devices 260 may have start points 245. Devices 260 may be synchronized with timeserver and device management 230, and then initialized by initialization function 224. After initialization, devices 260 may be brought into a waiting state at start points 245. Devices 260 brought into a waiting state may be reflected in waiting state 243 in data 240. A waiting state may be indicated by a property file configured to receive notifications that devices 260 have entered a waiting state. Devices brought into waiting state may continue to inquire into time server and device management 230 for a time until a start time or an absolute time may be acquired from time server and device management 230 using start times 235 and absolute time 233. When a start time from start times 235 may be acquired, devices 260 wait until the start time and then wait function or routine 248 is released.

Embedding a function such as wait( ) from wait function or routine 248 into a program may set one or more start points in start points 245 and may require a source code to be modified. Alternatively, a function from wait function or routine 248 may be embedded dynamically into an appropriate point of the program by setting one or more breakpoints in breakpoints 249 using graphical user interface (GUI) 222. Wait function or routine 248 may be injected by injector 232 without modifying existing software. Alternatively, responsive to an automatic search for initialization function 224, a wait function from wait function or routine 248 may automatically be injected by injector 230 into end points of initialization function 224.

Communications unit 210, in this example, provides for communication with other computers, data processing systems, and devices 260 via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 252 is located in a functional form on computer readable media 254 that is selectively removable and may be loaded onto or transferred to data processing system 200 for running by processor unit 204. Program code 252 and computer readable media 254 form computer program product 256. In one example, computer readable media 254 may be computer readable storage media 258 or computer readable signal media 250. Computer readable storage media 258 may include, for example, an optical or magnetic disc that is inserted or placed into a drive or other device that is part of persistent storage 208 for transfer onto a storage device, such as a hard drive, that is part of persistent storage 208. Computer readable storage media 258 also may take the form of a persistent storage, such as a hard drive, a thumb drive, or a flash memory that is connected to data processing system 200. In some instances, computer readable storage media 258 may not be removable from data processing system 200.

Alternatively, program code 252 may be transferred to data processing system 200 using computer readable signal media 250. Computer readable signal media 250 may be, for example, a propagated data signal containing program code 252. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 252 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 252 may be a server computer, a client computer, or some other device capable of storing and transmitting program code 252.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 258 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments are capable of being implemented in conjunction with any type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify a location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
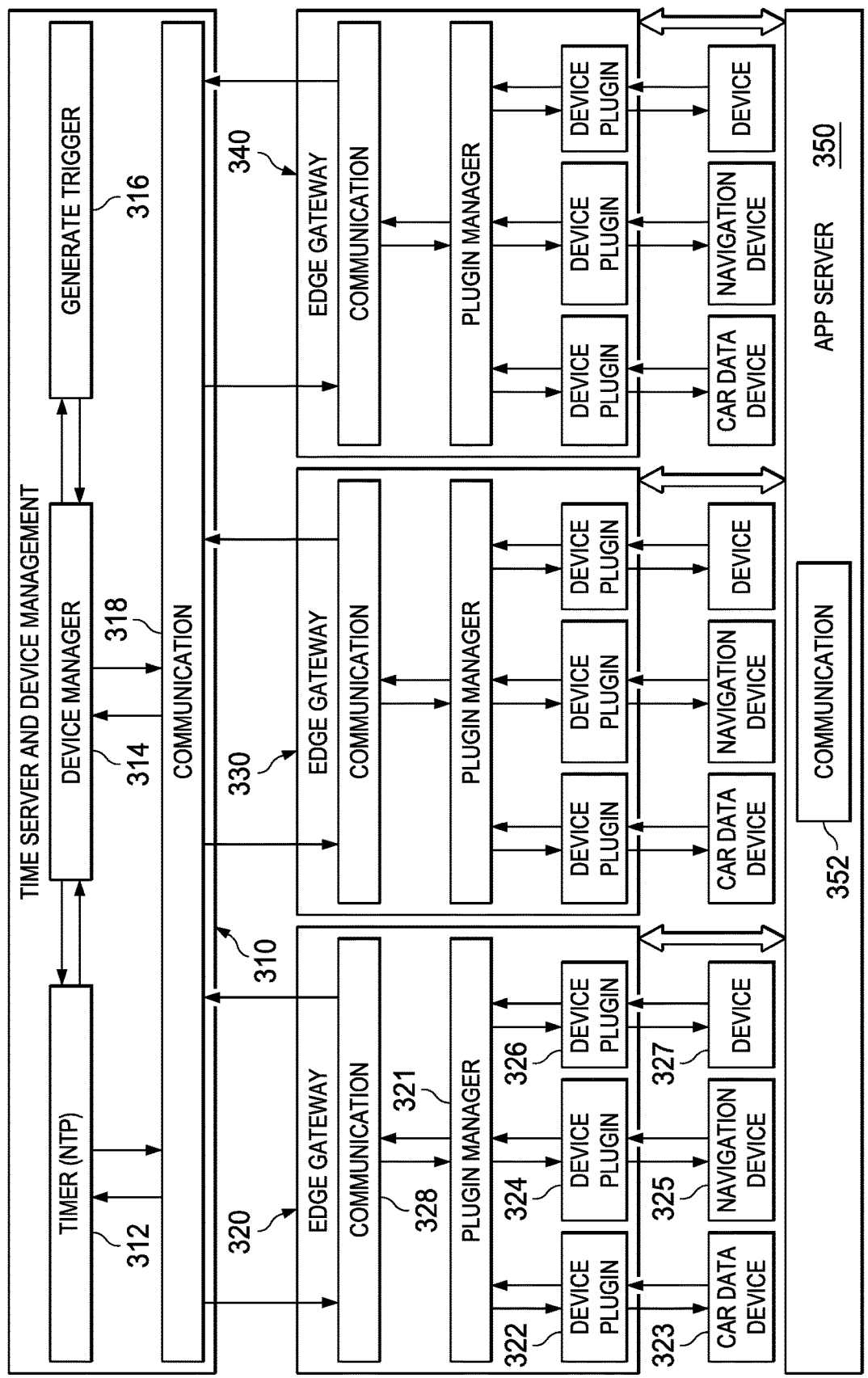
FIG. 3 depicts a schematic illustrating a configuration for synchronizing multiple devices using edge gateways, an application server, and a time server and device management application in accordance with an illustrative embodiment.

FIG. 3 depicts a schematic illustrating configuration 300 for synchronizing multiple devices using edge gateways, an application server, and a time server and device management application in accordance with an illustrative embodiment.

Multiple devices comprise car data device 323, navigation device 325, and device 327. Car data device 323, navigation device 325, and device 327 may be devices 260 in FIG. 2. Car data device 323 may be a device that obtains a vehicle speed, direction, travel distance and other desired vehicle information. Navigation device 325 may be a device to get longitude, latitude, map information and so on. Device 327 may be a health device, (for example to get heart rate of a driver), a drive recorder device, or some other device to get desired information. Device plugins 322, 324, and 326 may be device plug in 234 in FIG. 2. Device plugin 322 changes a physical device to a logical device by providing for communication between plugin manager 321 and a physical device such as car data device 323, navigation device 325 or device 327. For example, device plugin 322 may change units in kilometers per hour to miles per hour or degrees to millidegrees. Plug-in device 322 may transform a data format from raw data from a device to XML data. Device plugin 322 may be configured for car data device 323. Device plugin 324 may be configured for navigation device 325. Device plugin 326 may be configured for device 327. In an embodiment, plugin devices 322, 324, and 326 may be configured for car data device 323, navigation device 325, and device 327.

Plugin manager 321 may be a module to manage a logical device (a pair of device plugin and physical device). Plugin manager 321 may collect formatted and normalized data from some physical devices through the device plugins. Plugin manager may actuate psychical devices through device plugins such as plugin devices 322, 324, and 326. Plugin manager 321 may filter data and may also interpolate data. For example, plugin manager 321 may get data from device 321 every 500 milliseconds and may send averaged data every one second to time server and device management 310. Plugin manager 321 may receive data from device 327 every one second, and may send approximated data that may be made by an interpolation algorithm every 500 milliseconds. Communication 318 may be communications unit 210 in FIG. 2. Communication 318 may be a module to communicate between edge gateway 320 and app server 350.

Timer 312 may be a timer module that supports network timer protocol and be synchronized with correct time. Device manager 314 may be a module to manage a beginning time for each device. Generate trigger 316 may be a module to set a trigger and notify a trigger. Generate trigger 316 may be assigned a start time and may send a trigger to plugin manager 321. Timer 312 may receive a correct time through plugin manager 321 and communication 318 from an external Network Time Protocol (NTP) server. ETP server may be data processing system 200 in FIG. 2.

Each device may get a correct time from timer 312. Beginning time for each device may be set to generate trigger 316. Generate trigger 316 may set a beginning time for each device to device manager 314. Device manager 314 may get time from timer 312. If it is the beginning time of the device, device manager 314 may notice it to generate trigger 316. Generate trigger 316 may wake up each device. Synchronized data may be sent to app server 350 from plugin manager 321. Edge gateway 330 and edge gateway 340 are similar to edge gateway 320. App server 350 may provide communication 352 between edge gateway 320, edge gateway 330 and edge gateway 340. App server 350 may be data processing system 200 in FIG. 2.

Figure 4:
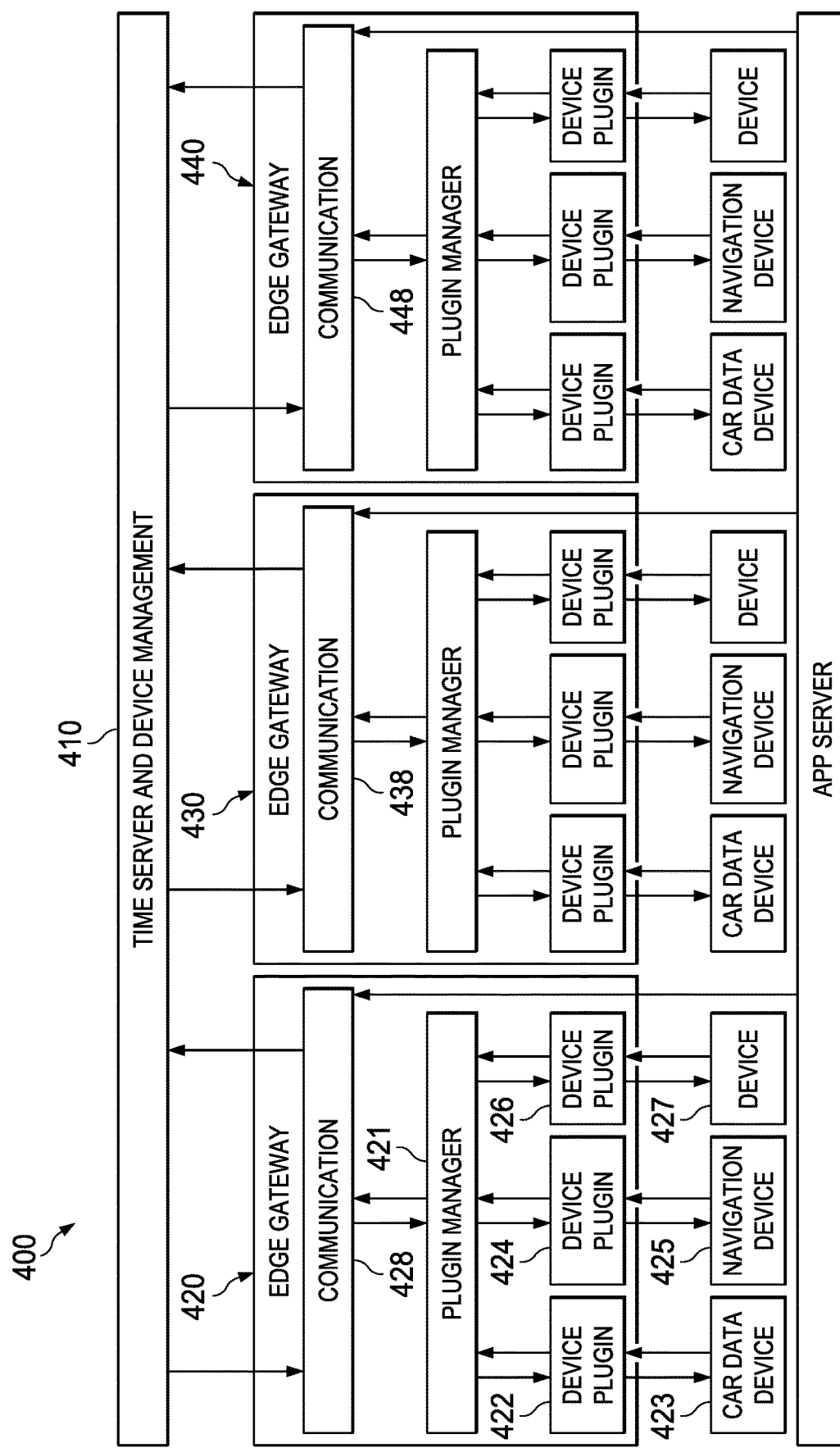
FIG. 4 depicts a schematic illustrating a configuration for synchronizing multiple devices using edge gateways, an application server, and a time server and device management application illustrating a process in accordance with an illustrative embodiment.

FIG. 4 depicts a schematic illustrating configuration 400 for synchronizing multiple devices using edge gateways, an application server, and a time server and device management application illustrating a process in accordance with an illustrative embodiment. The illustrative embodiment of FIG. 4 is similar to the illustrative embodiment of FIG. 3. In FIG. 4, timer server and device management 410 communicates directly with communication 428 of edge gateway 420, communication 438 of edge gateway 430, and communication 448 of edge gateway 440. App server 450 communicates directly with communication 428 of edge gateway 420, communication 438 of edge gateway 430, and communication 448 of edge gateway 440. Plugin manager 421 is similar to plugin manager 321 in FIG. 2. Device plugins 422, 424, and 426 are similar to device plugins 322, 234, and 326 in FIG. 3. Car data device 423 is similar to car data device 323 in FIG. 3. Navigation device 425 is similar to navigation device 325 in FIG. 3. Device 427 is similar to device 327 in FIG. 3.

Figure 5:
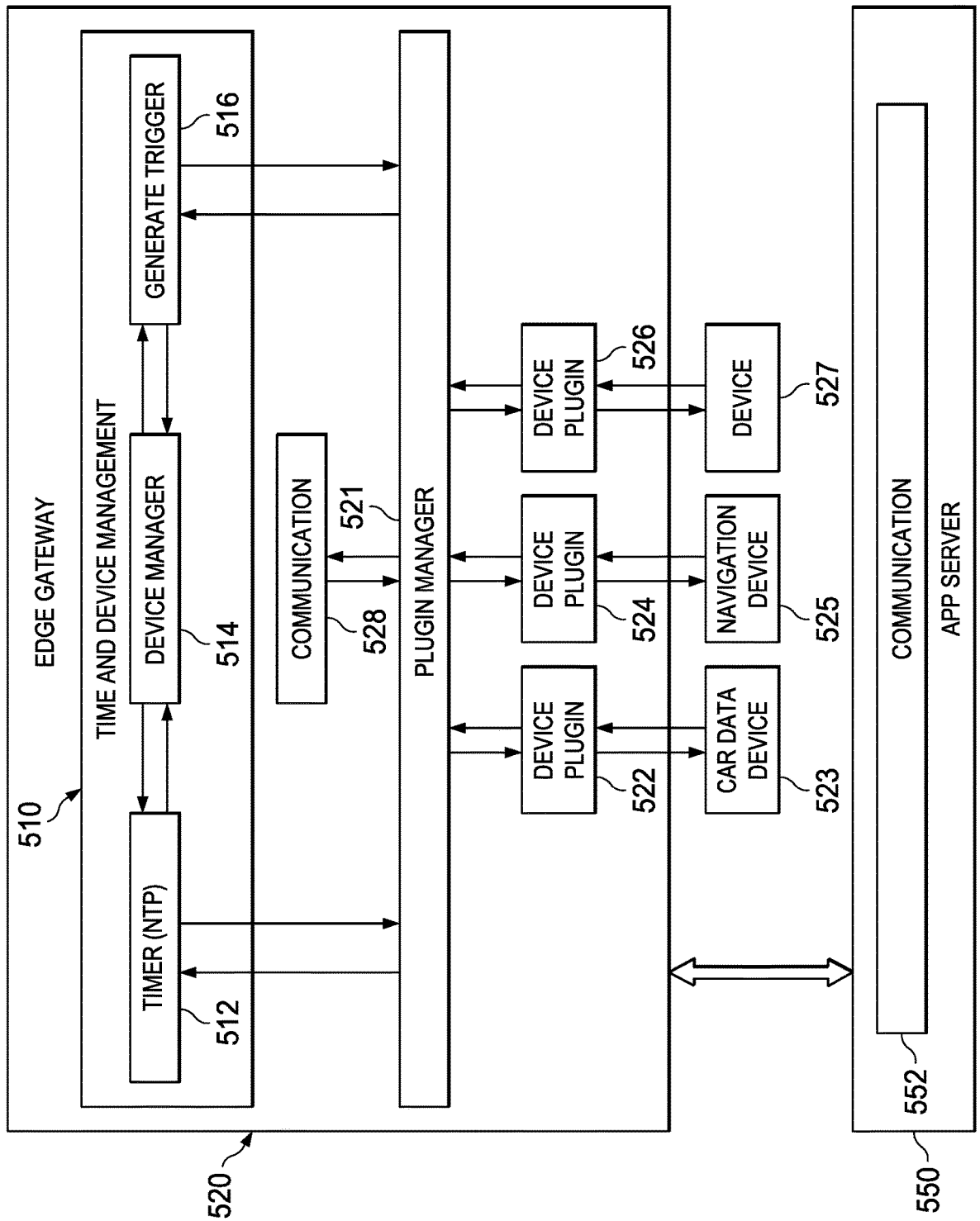
FIG. 5 depicts a schematic illustrating a configuration for synchronizing multiple devices in an edge gateway in accordance with an illustrative embodiment.

FIG. 5 depicts a schematic illustrating configuration 500 for synchronizing multiple devices in an edge gateway in accordance with an illustrative embodiment. In an illustrative embodiment, synchronization may be performed in edge gateway 520. Time and device management 510 may be placed in edge gateway 520 to allow device plugins 522, 524, and 526 in edge gateway 520 to be synchronized directly with edge gateway 520. In the configuration of FIG. 5, time and device management function 510 communicates directly with plugin manger 521 and is not connected to communication 528 of edge gateway 520 or to communication 552 of app server 550. Timer 512 is similar to timer 312 in FIG. 3. Device manager 514 is similar to device manager 312 in FIG. 3. Generate trigger 516 is similar to generate trigger 316 in FIG. 3. Car data device 525 is similar to car data device 323 in FIG. 3. Navigation device 525 is similar to navigation device 325 in FIG. 3. Device 527 is similar to device 327 in FIG. 3. The configuration of FIG. 5 may be used when there is no need for synchronization with multiple devices in multiple edge gateways.

Figure 6:
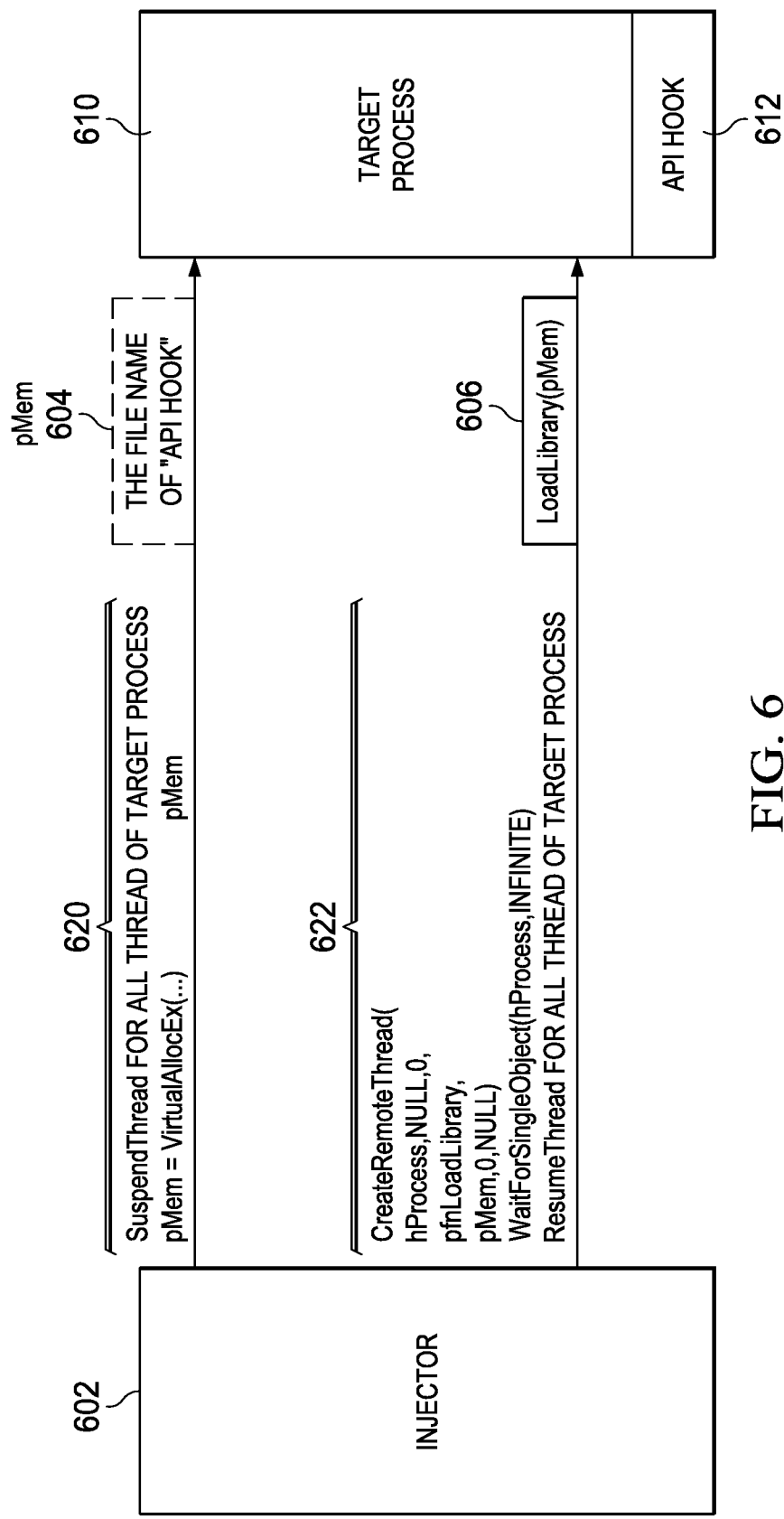
FIG. 6 depicts a schematic illustrating injection of a wait function in accordance with an illustrative embodiment.

FIG. 6 depicts an example of injection of a wait function in accordance with an illustrative embodiment. In this context, "hooking" means that an application's request for executing a function may be automatically redirected to the injected code so that some additional operations can be done before or after running an original function's code without modifying or recompiling a caller's module. Injector 602 may be a module that performs hooking in order to inject a wait function. Target process 610 may be a process having one or more target functions that may be hooked by injector 602.

API hook 612 may be a module that consists of a new function for an intercepted original function. When target process 610 is hooked by injector 602, a new function may be called instead of an original function. In an illustrative embodiment, if target process 610 has CreateFile API. CreateFile API is hooked by injector 602, the original function, CreateFile API, may be replaced by MyCreateFile in API hook 612. Once the hook and replacement is performed, MyCreateFile will be called instead of CreateFile. Injection may be performed dynamically by injector 602. Injector 602 may call SuspendThread 620 to suspend all threads of target process 610. VirtualAllocEx ( . . . ) (see 620) may allocate memory in target process 610. Injector 602 may save a start address of the memory to variable "pMem."

Injector 602 may write a full path of API hook 612 on the allocated memory. Injector 602 may call CreateRemoteThread 622 with an address of Load Library with pMem variable 606. CreateRemoteThread 622) may call LoadLibrary with pMem variable 606 in target process 610 internally. LoadLibrary with pMem variable 606 may load API hook 612 in target process 610 and LoadLibrary with pMem variable 606 may be started internally. API hook 612 performs hooking in target process 610 internally. API hook 612 may replace any function in API hook 612. For example, API Hook 612 may replace CreateFile to MyCreateFile. After injector 602 calls ResumeThread (see 622), all threads of target process 610 may resume.

Figure 7:
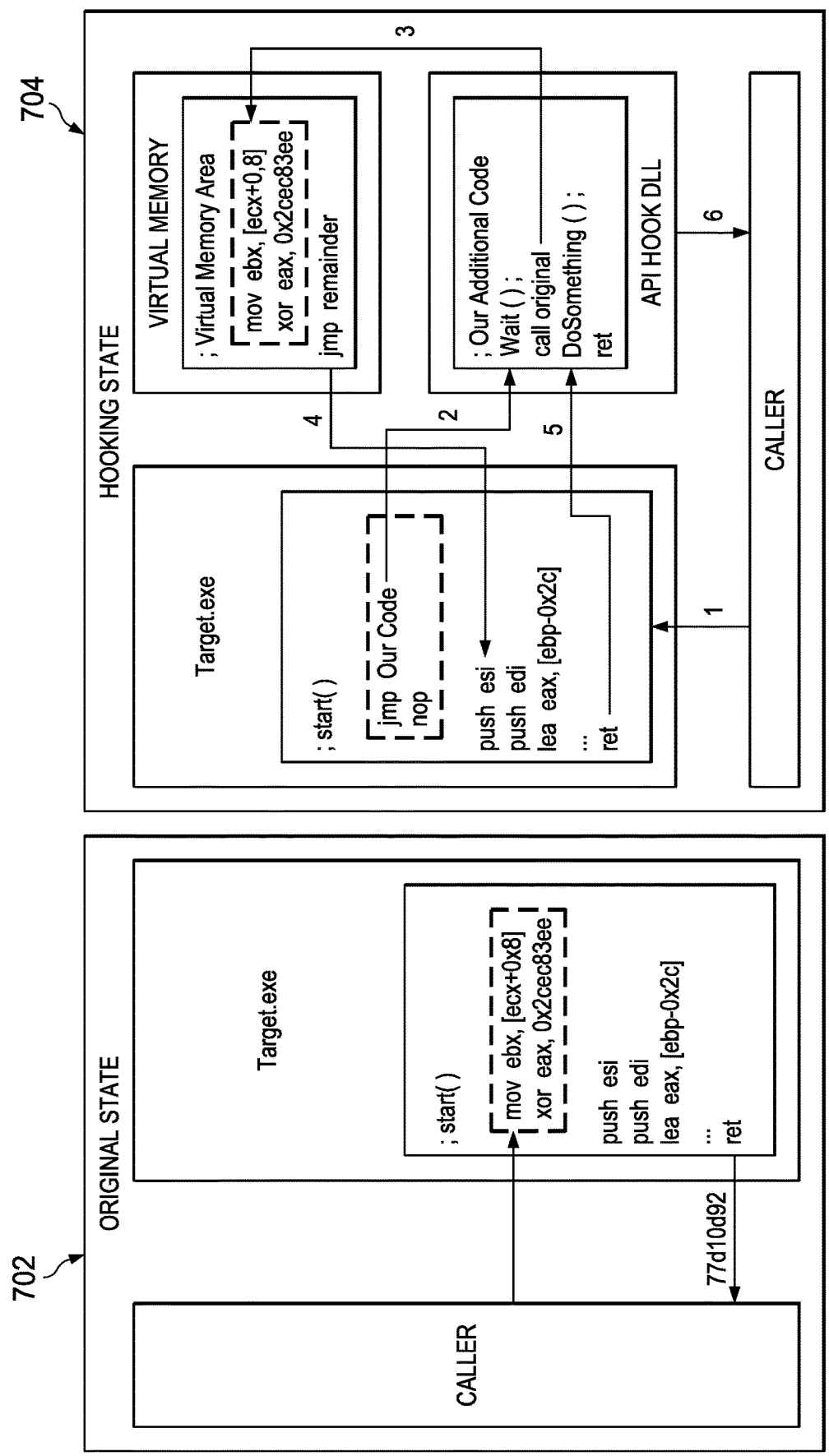
FIG. 7 depicts a schematic illustrating injection of a wait function in accordance with an illustrative embodiment.

FIG. 7 depicts another example of injection of a wait function in accordance with an illustrative embodiment. Conceptual diagrams of instruction codes stored in memory, comparing the original state before "hooking" with the modified state after "hooking" are depicted. For transferring from the original state to the hooking state, several bytes of code at the top of the function are replaced with other instructions so that the function call may be redirected to another function. Those original instructions are backed up in the virtual memory area so that the original function can be executed after finishing the redirected codes. API Hook DLL in hooking state 704 may be a dynamically-injected module which implements additional function codes for caller applications to execute. Original state 702 may be the state before enabling Wait( ) function, and hooking state 704 may be the state after enabling it. In hooking state 704, any application automatically calls the Wait( ) function in API Hook DLL in hooking state 704 after entering into start( ) function, without modifying or recompiling application code.

In original state 702, when a caller—Target.exe—in the illustrative embodiment—calls function start( ), the central processing unit executes the instruction code at the function's entry point address (77d10d2) and returns to the caller after executing the final "ret" instruction. On the other hand, in hooking state 704, when Target.exe calls function start( ) (see arrow line 1), the central processing unit executes the 'jmp' instruction indicating a jump to injected code (see arrow line 2) and then executes additional operations, Our Additional Code, and calls the "Wait( )" function. After executing Our Additional Code and Wait( ), the central processing unit calls the original function's code which has been backed up in virtual memory (see arrow line 3). The last instruction in virtual memory may be a 'jmp' instruction, which causes a jump to the remaining code in the original function (see arrow line 4) consequently completing the original function code. The final 'ret' instruction makes the central processing unit execute the remaining part of injected codes (see arrow line 5), which may be code to do nothing and return to the caller (see arrow line 6).

Code segment 77d10d2 may be an example of a memory address pointing to the start( ) function in target.exe of original state 702. Target.exe may be a memory block containing instruction codes of function start( ). The code "ret" may be a final instruction of "start( )" function. Target.exe in original state 702 may be similar to target.exe in hooking state 704, except for the first two instructions which have been replaced with other instructions so that the function call may be redirected to the code in API Hook DLL of hooking state 704. Virtual memory in hooking state 704 stores instruction code at the top of an original function. Two instructions in original state 702 may be replaced with other instructions in hooking state 704. Wait( ) function may cause the central processing unit to wait for all other devices to be synchronized.

Figure 8:
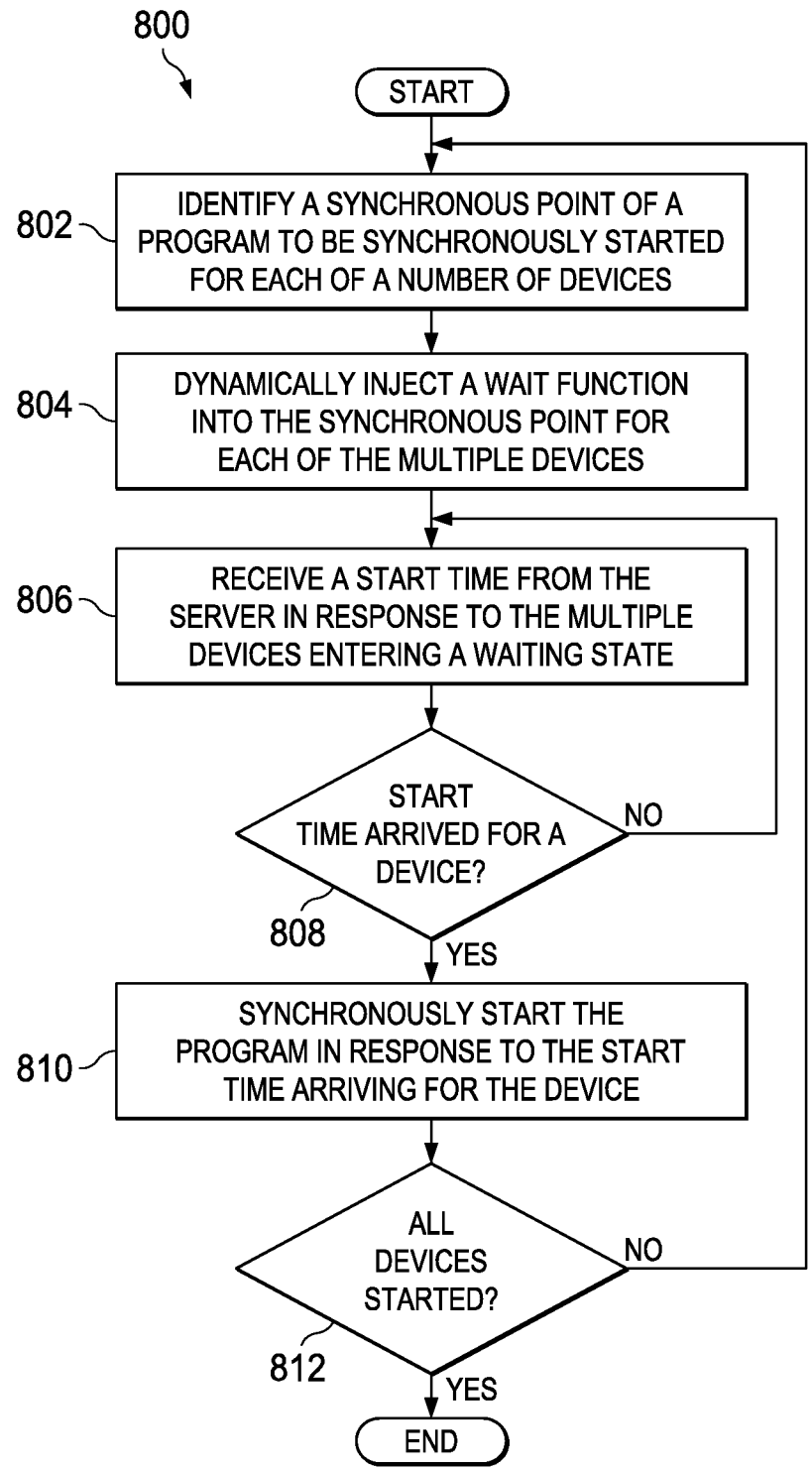
FIG. 8 is a flowchart illustrating a process for synchronizing multiple devices in accordance with an illustrative embodiment.

FIG. 8 depicts a flowchart illustrating a process for synchronizing multiple devices in accordance with an illustrative embodiment. The use of the technique prevents differences in data that arise from lack of synchronization. The technique can be used not only for tests, but also for the actual synchronization of the multiple devices. Synchronization logic may be dynamically injected without software on the devices being modified, which does not require modification cost. As used herein "dynamically injected" means instruction codes in memory are modified while the application may be running so that the additional logic can be executed when the application operates that function. A synchronous point may be the memory address of a function which should be synchronously executed with other devices, and may be the address where wait( ) function may be placed.

Process 800 is for synchronously starting programs on multiple devices connected to a server start. A synchronous point of a program to be synchronously started is identified for each of a number of devices (Step 802). A wait function is dynamically injected into the synchronous point for each of the multiple devices (Step 804).

A start time is received from the server in response to the multiple devices entering a waiting state (Step 806). A determination may be made whether a start time for a device has arrived (Step 808). If a start time for the device has not arrived, process 800 returns to step 806. Responsive to receiving a start time for a device, a program is synchronously started in response to the start time arriving for the device (Step 810). A determination is made as to whether all devices have been started (Step 812). If all devices have not been started, process 800 returns to step 802. If all devices have been started, process 800 terminates.

In an embodiment, the start time received by one of the multiple devices may be different from the start time received by another one of the multiple devices. In an embodiment, a server may be provided with a function of a time server and each of the multiple devices may be synchronized with the time server. In an embodiment, time in the device may be corrected. In an embodiment, the start time may not be relative time but absolute time. In an embodiment, the wait function may be operated according to a sequence that waiting may be performed until the start time may be sent, the start time may be received from the server, and the start time may arrive.

The time server can be put not only on multiple edge gateways, but also on a single edge gateway to allow the multiple devices in the edge gateway to be synchronized. Delay activation of the devices can also be intentionally made as well as synchronization.

Figure 9:
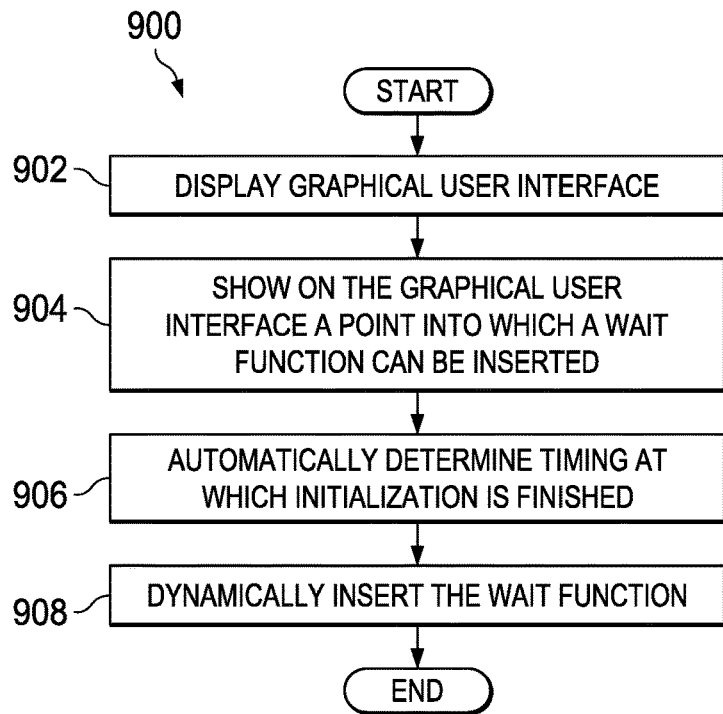
FIG. 9 is a flowchart illustrating a process for dynamically inserting a wait function in accordance with an illustrative embodiment.

FIG. 9 depicts a flowchart illustrating a process for dynamically inserting a wait function in accordance with an illustrative embodiment. There may be several ways to insert the wait function. Wait functions may be embedded into source codes. A process, such as process 900 is displayed on a graphical user interface (Step 902). A point into which a wait function is inserted is shown on the graphical user interface (Step 904). Timing at which initialization is finished is automatically determined (Step 906). The wait function is dynamically injected into the part (Step 908). Thereafter, the process terminates. For example, when a thread class may be defined like Java and extended to implement the class, a start method generally bears an initialization part to dynamically inject the wait at the time of ending the method.

Figure 10:
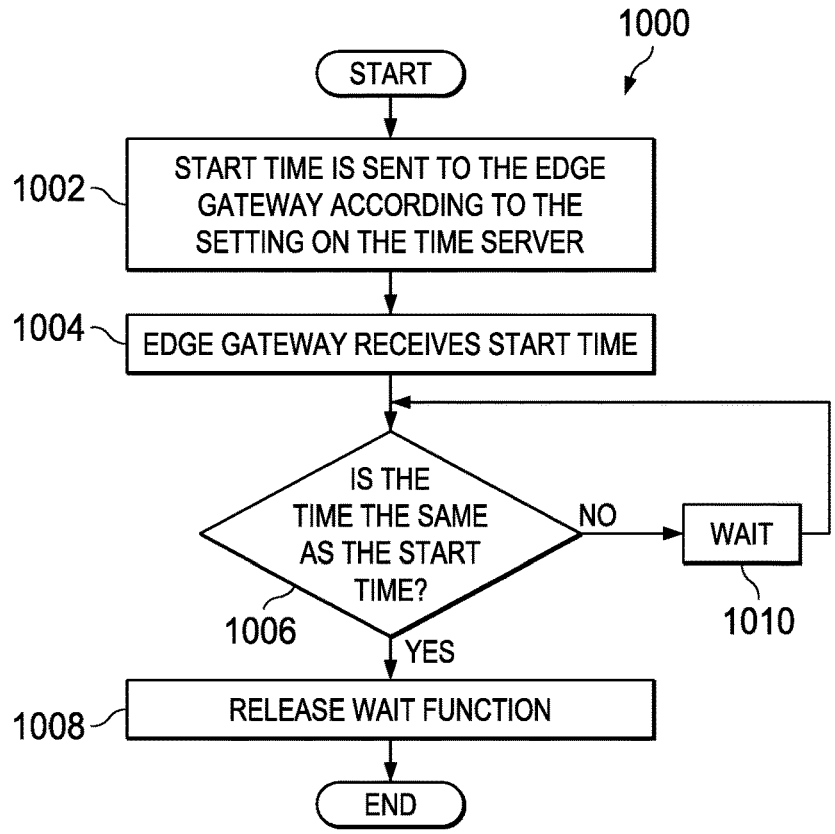
FIG. 10 is a flowchart illustrating a process for dynamically releasing a wait function in accordance with an illustrative embodiment.

FIG. 10 depicts a flowchart of a process for dynamically releasing a wait function in accordance with an illustrative embodiment. Process 1000 starts. A start time is sent to the edge gateway according to the setting on the time server (1002). The edge gateway receives a start time. (Step 1004) A determination is made whether the time is the same as the start time (Step 1006). If not, process 1000 waits (Step 1010). If the time is the same as the start time, the wait function is released (Step 1008). At the start time, the wait function may be released. Release of the start time may cause all the devices to be synchronized. Thereafter, the process terminates.

Figure 11:
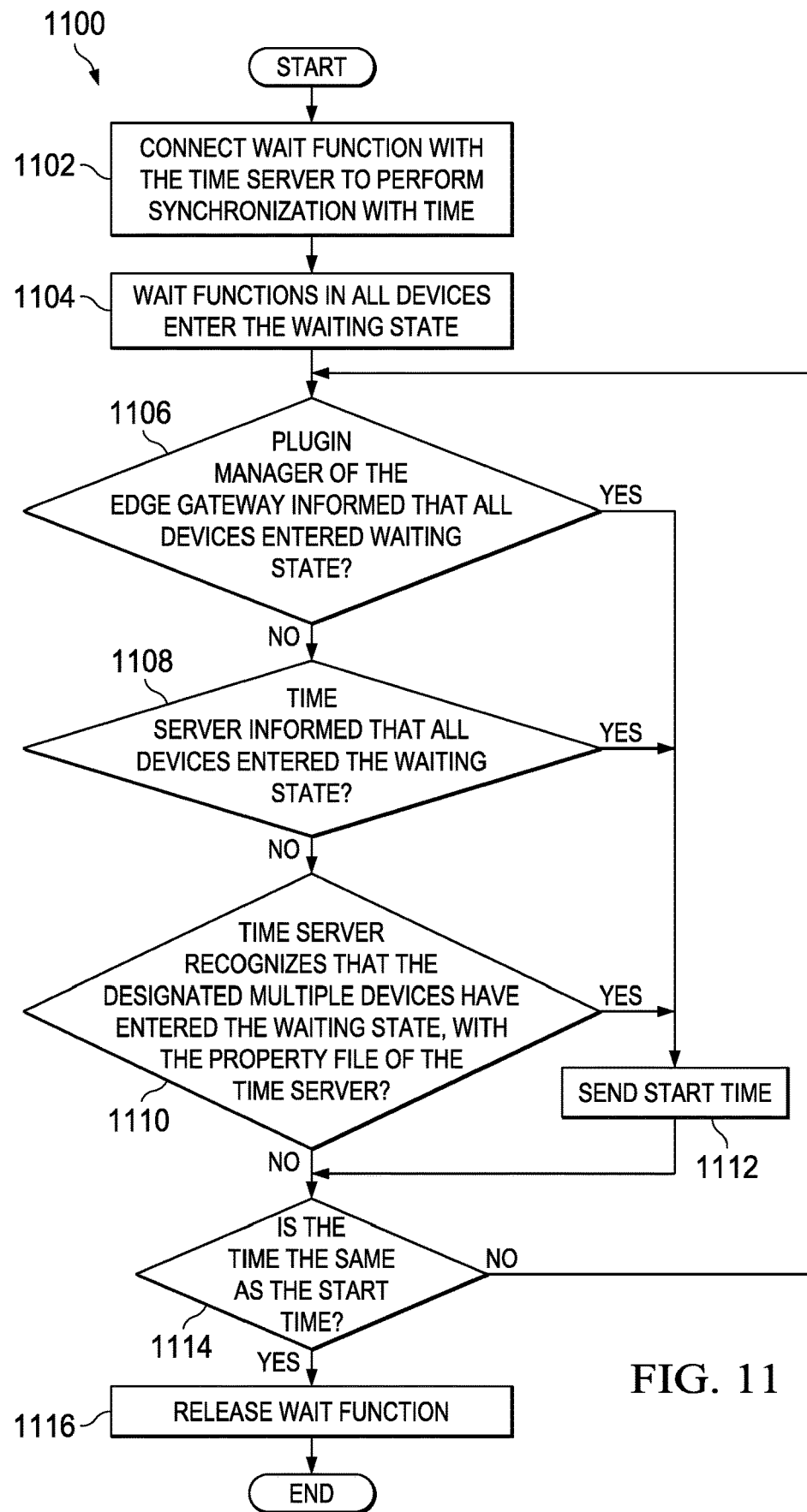
FIG. 11 is a flowchart illustrating a number of triggers for sending a start time in accordance with an illustrative embodiment.

FIG. 11 depicts a flowchart of a number of triggers for sending a start time in accordance with an illustrative embodiment. Process 1100 starts. A wait function is connected with a time server to perform synchronization with time (Step 1102). Wait functions in all devices enter the waiting state (Step 1104). A determination is made whether the plugin manager of the edge gateway has been informed that all devices have entered the wait state (step 1106). If the plugin manager of the edge gateway has been informed that all devices have entered the wait step, the start time may be sent (Step 1112). If not, a determination is made whether a time server has been informed that all devices have entered the waiting state (Step 1108). If the time server has been informed that all devices have entered the waiting state, process 1100 goes to step 1112. If not, a determination is made whether the time server recognizes that the multiple devices have entered the waiting state, with the property file of the time server (Step 1110). If the time server recognizes that the multiple devices have entered the waiting state, with the property file of the time server, the process goes to step 1112. Process 1100 determines whether the time is the same as the start time (Step 1114). If the time is the same as the start time, then the wait function may be released (Step 1116). If the time is not the same as the start time, process 1100 goes to step 1106. After the wait function is released in step 1116, process 1100 terminates thereafter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for synchronously starting programs on multiple devices connected to a server, comprising:
a bus system;
a storage device connected to the bus system, wherein the storage device stores program instructions;
a processor connected to the bus system, wherein the processor executes the program instructions to:
identify a synchronous point of a program to be synchronously started for each of the multiple devices;
dynamically inject a wait function into the synchronous point of the program to be synchronously started for each of the multiple devices;
receive a start time from the server in response to the multiple devices entering a waiting state; and
synchronously start the programs in response to the start time arriving for each of the multiple devices, wherein the wait function is operated according to such a sequence that a time server is connected to be synchronized therewith, waiting is performed until the start time is sent, the start time is received from the time server, and the wait function is released when the start time arrives, wherein the wait function is a function that provides inter-thread synchronization or process-process synchronization on an operating system or on different operating systems.

2. The system according to claim 1, wherein the start time received by one of the multiple devices is different from the start time received by another one of the multiple devices.

3. The system according to claim 1, wherein the server is provided with a function of a time server and each of the multiple devices is synchronized with the time server, and the method further comprises converting a relative time of the start time into an absolute time of the start time and sending the absolute time of the start time to each device.

4. The system according to claim 2, wherein the start time is not relative time but absolute time.

5. The system according to claim 1, wherein the synchronous point is a point within the program on one device to be synchronously started with another program on another device.

6. A computer program product for synchronously starting programs on multiple devices connected to a server, the computer program product comprising a computer readable storage medium having program instructions executable by a computer to cause the computer to perform a method comprising:
identifying a synchronous point of a program to be synchronously started for each of the multiple devices;
dynamically injecting a wait function into the synchronous point of the program to be synchronously started for each of the multiple devices;
receiving start time from the server in response to the multiple devices entering a waiting state; and
synchronously starting the programs in response to the start time arriving for each of the multiple devices, wherein the wait function is operated according to such a sequence that a time server is connected to be synchronized therewith, waiting is performed until the start time is sent, the start time is received from the time server, and the wait function is released when the start time arrives, wherein the wait function is a function that provides inter-thread synchronization or process-process synchronization on an operating system or on different operating systems.

7. The computer program product according to claim 6, wherein the start time received by one of the multiple devices is different from the start time received by another one of the multiple devices.

8. The computer program product according to claim 6, wherein the server is provided with a function of a time server and each of the multiple devices is synchronized with the time server, and the method further comprises converting a relative time of the start time into an absolute time of the start time and sending the absolute time of the start time to each device.

9. The computer program product according to claim 7, wherein the start time is not relative time but absolute time.

10. The computer program product according to claim 6, wherein the synchronous point is a point within the program on one device to be synchronously started with another program on another device.

\* \* \* \* \*